Feb. 4, 1930.  E. SCHLESINGER  1,745,956
PHOTOGRAPHIC COPYING APPARATUS
Filed May 5, 1927  2 Sheets-Sheet 1
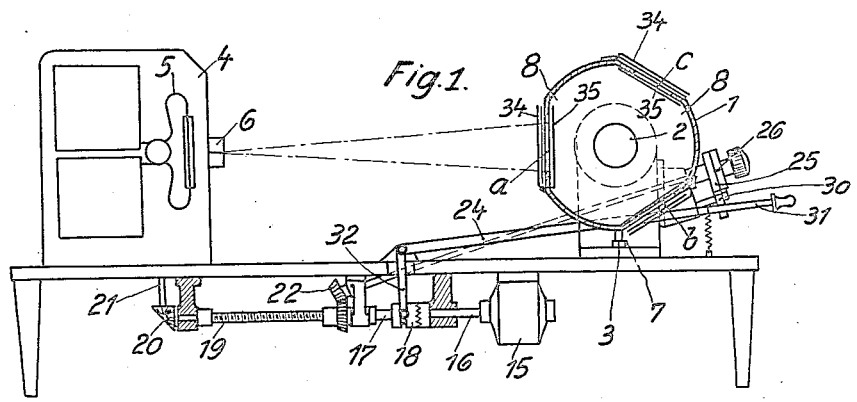
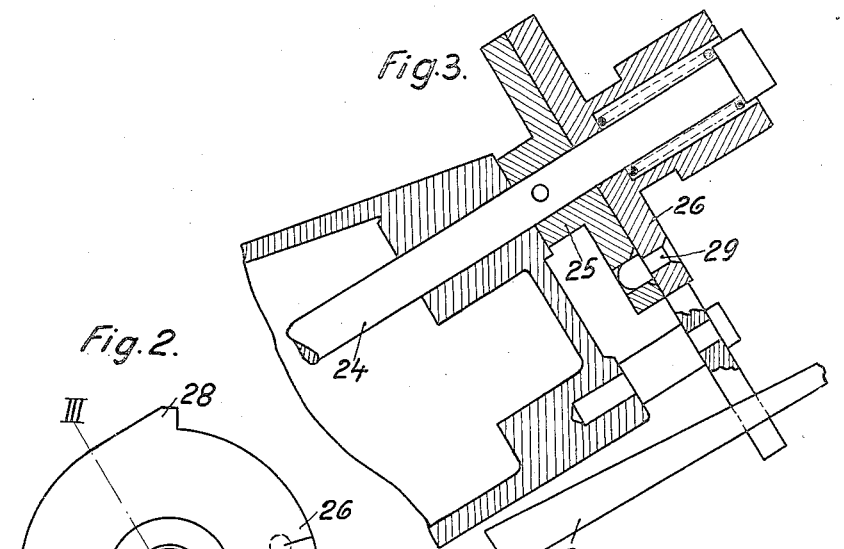
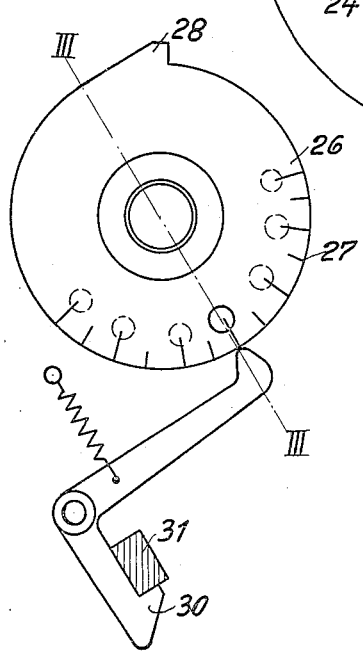
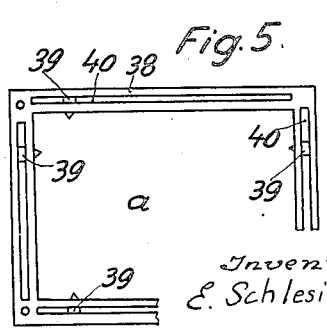
Inventor:
E. Schlesinger
By: Marks & Clark
Attys.

Feb. 4, 1930.  E. SCHLESINGER  1,745,956

PHOTOGRAPHIC COPYING APPARATUS

Filed May 5, 1927   2 Sheets-Sheet 2

Inventor:
E. Schlesinger

Patented Feb. 4, 1930

1,745,956

UNITED STATES PATENT OFFICE

EUGEN SCHLESINGER, OF BERLIN-SCHONEBERG, GERMANY

PHOTOGRAPHIC COPYING APPARATUS

Application filed May 5, 1927. Serial No. 189,106.

This invention relates to apparatus for photographically copying titles, inscriptions, text, drawings and the like on film bands, comprising a photographic apparatus, means for carrying a film band in a position so as to be capable of being exposed through the photographic apparatus, means for driving said film band, a rotatable drum having a plurality of windows in its periphery, a source of light in said drum and means for aligning said drum capable of locking the drum with said windows successively at right angles to the optical axis of the photographic apparatus.

The present invention has for its object to provide an improved construction of such apparatus.

One object of the invention is to prevent distortion or warping of the films to be copied owing to the heat of the source of light in the drum and with this object in view the copy films are inserted between plates of glass in the windows of the drum. A suitable arrangement is that in which the drum is so spaced out, for the number of copy frames which are to be arranged on its circumference, that as soon as the copy exposed to the film band is locked in the photographing position, the uppermost frame occupies an oblique position, owing to which the copy may slide down from the frame, as soon as its locking device is opened, into a receiver adjoining the oblique surface.

Another object of the invention is to provide means for ensuring accurate optical registration during the projection, and for this purpose means are provided for adjusting or aligning the copy films so that after insertion in the drum they are properly positioned.

Figure 4:
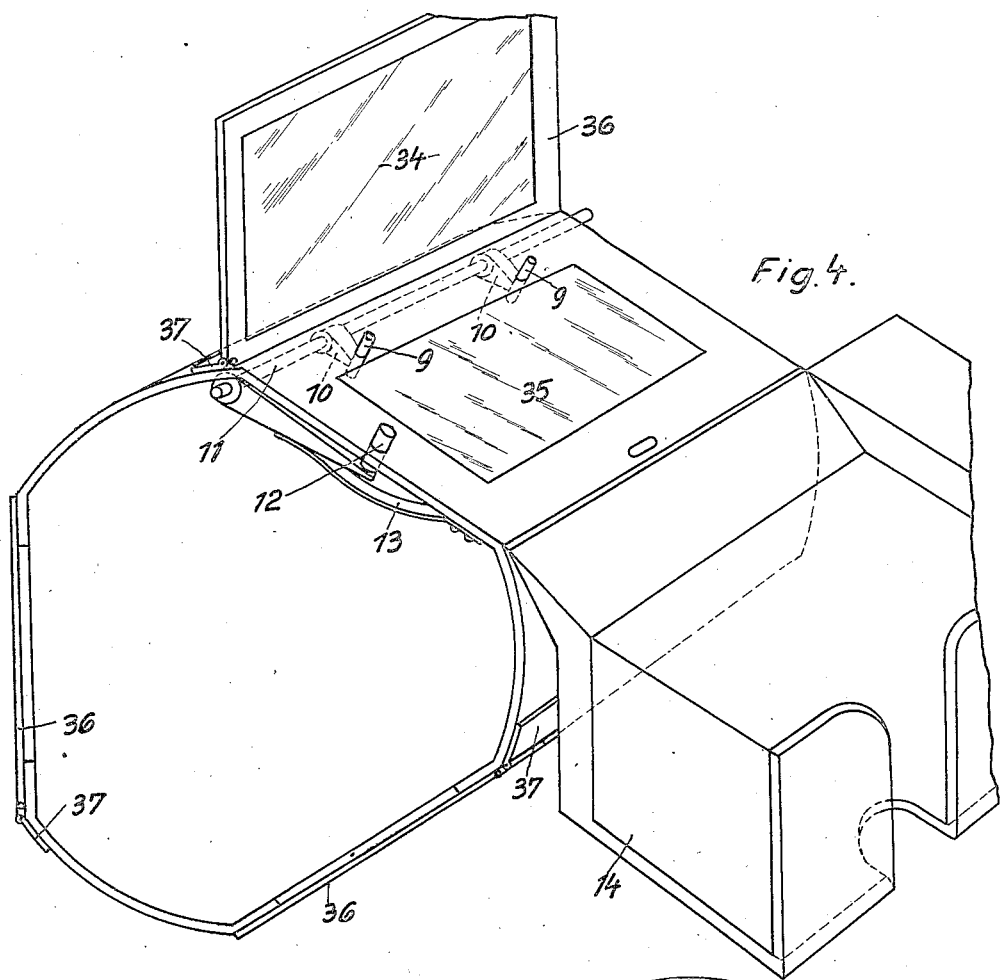

Other characteristics of the invention will be explained with reference to the drawings, in which Figure 1 is a diagrammatic side elevation, Figure 2 the device for setting the length of the film band, Figure 3 a section on the line III—III of Figure 2, Figure 4 a perspective view of the hollow drum with the container or receiver for the copies used, Figure 5 a view of an appliance for enabling the picture film to be accurately adjusted optically, and Figure 6 a diagrammatic plan of the twin drum.

1 is the horizontal hollow drum which is supported by its horizontal spindle (not shown) in any desired manner and receives in its interior the source of light 2. The drum 1 is designed for three different copies $a$, $b$, $c$ and flattened for receiving the copy frames. The division of the drum in accordance with the copies $a$, $b$, $c$ and their relation to a locking device 3, are so chosen that the copy $a$ exposed to the film is always locked at right angles to the optical axis of the photographic apparatus 4. The photographic apparatus 4 carries the usual film band 5 and the lens 6. The locking device is constituted by a spring controlled pin 7 which springs into the corresponding holes 8 next to the copies $a$, $b$, $c$.

Since it is important that the projection of the films should be effected in a manner which is exactly correct optically, care must be taken that the films are not warped or distorted by the comparatively great heating which they experience while they are fastened to the drum. For this purpose the copies $a$, $b$ and $c$ are located between glass or like plates 34 and 35. Of these plates the plate 35 is preferably fitted fixedly on to the inside of the drum, while the plate 34 is mounted on a frame 36 which is oscillatable about a hinge 37. This frame is raised when a fresh film is to be changed. Figure 4 serves to make this process clear.

When the copy $a$ is in the position shown in Figure 1, the uppermost copy $c$ is in such an oblique position that after its locking device is opened, it slides from the frame. The copy is placed on pins 9 with its corresponding holes. The pins 9 are secured by means of arms 10 to a rod 11 and the rod is provided with a handle 12 which rests on a spring 13. If the handle 12 is turned down, the pins 9 become disengaged from the copy, and release the copy $c$ (Figure 1) which slides down into the container 14 adjoining the drum.

As already mentioned it is necessary to ensure the registering of the films with the optical axis. Furthermore, however, particularly when it is a question of trick photographs, the necessity may arise for projecting particular points of the film located in part unsymmetrically on the particular points of the strip of film 5. In order to comply with this and similar requirements by the aid of the apparatus according to the invention, a device is employed by the aid of which the film can be so marked that it subsequently takes up in the drum absolutely the correct position. Such an aligning device may be constructed in any convenient manner. Figure 5 shows a construction wherein a frame 36 is used. This frame 36 may in case of need itself be inserted with the film in the drum 8. The frame comprises a series of marking numerals 39, which are adjustable in slots, and in this manner provide the possibility of accurately aligning the film optically.

For setting a given number of photographs on the film band is used the following device:

The film band 5 is driven in the known manner by an electric motor 15 by means of a spindle 16. The spindle 16 drives by means of a coupling 18 a spindle 17 and continues to transmit motion by means of a flexible shaft 19 to a bevel wheel gear 20 and a spindle 21. From the latter is driven the film band 5. The driven spindle 17 drives by means of a gear 22 a spindle 24 to which is secured a perforated disc 25. The spindle 24 carries further a cam disc 26 with a scale 27 and a cam 28. The cam disc 26 is coupled to the disc 25 by a pin 29. The division of the scale on the cam disc 26 and the number of holes of the disc 25 determines the length of the film band or the number of photographs. The cam disc rotates in accordance with the ratio of the gear 22 and operates a lever 30 engaging with its circumference under the action of a spring. On the lever rests a rod 31 of the releasing device 32 of the coupling 18. As soon as the cam 28 slides on the lever, the coupling 18 is disconnected.

Figure 6:
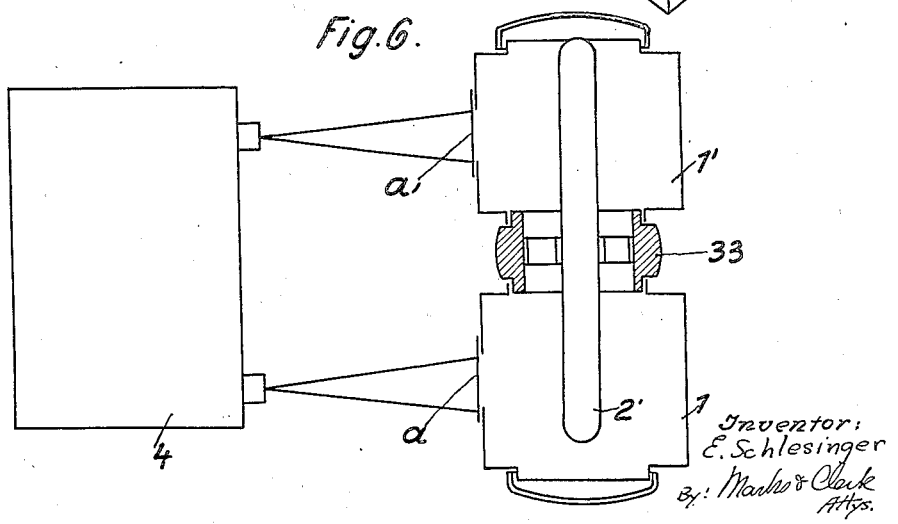

According to Figure 6, two drums 1, 1' are combined to a twin arrangement, that is to say, so that they abut against the joint bearing 33 at their open inner ends. Through the open connection of the two drums is placed the joint source of light 2'. Each drum has three copies a, b, c. In accordance with the duplication of the drum, the photographic apparatus 4 is also duplicated.

What I claim is:—

1. In apparatus for photographically copying inscriptions and drawings on a film band, the combination with a photographic apparatus, means for carrying a film band in a position so as to be capable of being exposed through the photographic apparatus, means for driving said film band, a rotatable drum having a plurality of windows in its periphery, a source of light in said drum and means for aligning said drum capable of locking the drum with said windows successively at right angles to the optical axis of the photographic apparatus, of glass plates fixed to the drum, one of said glass plates being arranged in each window, frames hinged to the drum so as to be capable of registering with said glass plates, film aligning means arranged on said frames and glass plates secured to said frame, for the purposes set forth.

2. In apparatus for photographically copying inscriptions and drawings on a film band, the combination with a photographic apparatus, means for carrying a film band in a position so as to be capable of being exposed through the photographic apparatus, means for driving said film band, a rotatable drum having a plurality of windows in its periphery, a source of light in said drum and means for aligning said drum capable of locking the drum with said windows successively at right angles to the optical axis of the photographic apparatus, of glass plates fixed to the drum, one of said glass plates being arranged in each window, frames hinged to the drum so as to be capable of registering with said glass plates, film aligning means comprising slots in the frames and setting pointers slidably mounted in said slots, and glass plates secured to said frames, for the purposes set forth.

In testimony whereof I have signed my name to this specification.

EUGEN SCHLESINGER.